US007872450B1

(12) United States Patent
Cohen et al.

(10) Patent No.: US 7,872,450 B1
(45) Date of Patent: Jan. 18, 2011

(54) ADAPTIVE BATTERY CHARGING

(75) Inventors: Daniel C. Cohen, Newton, MA (US); William L. Owens, Framingham, MA (US); Franklin Lee, Framingham, MA (US); James D. Orlando, Amesbury, MA (US)

(73) Assignee: American Power Conversion Corporation, West Kingston, RI (US)

( * ) Notice: Subject to any disclaimer, the term of this patent is extended or adjusted under 35 U.S.C. 154(b) by 594 days.

(21) Appl. No.: 11/025,554

(22) Filed: Dec. 29, 2004

(51) Int. Cl.
H02J 7/00 (2006.01)
H02J 7/04 (2006.01)

(52) U.S. Cl. .................. 320/134; 320/137; 320/151; 320/160; 320/163

(58) Field of Classification Search ............. 320/134, 320/149, 103, 111, 150, 137, 151, 152, 156, 320/157, 159, 160, 161, 162, 163, 164, 136, 320/135; 307/66, 46
See application file for complete search history.

(56) References Cited

U.S. PATENT DOCUMENTS

| 5,721,481 | A | * | 2/1998 | Narita et al. ............ 320/111 |
| 5,777,399 | A | * | 7/1998 | Shibuya ................... 307/66 |
| 5,777,454 | A | * | 7/1998 | McAndrews et al. ....... 307/66 |
| 5,982,151 | A | * | 11/1999 | Nagai et al. ............. 320/141 |
| 6,049,141 | A | * | 4/2000 | Sieminski et al. ......... 307/44 |
| 6,140,801 | A | * | 10/2000 | Aoki et al. .............. 320/132 |
| 6,285,166 | B1 | * | 9/2001 | Cannon .................. 320/134 |
| 6,311,279 | B1 | * | 10/2001 | Nguyen .................. 713/300 |
| 6,605,879 | B2 | * | 8/2003 | Wade et al. .............. 307/66 |
| 2001/0017534 | A1 | * | 8/2001 | Haraguchi et al. ........ 320/134 |
| 2002/0033692 | A1 | * | 3/2002 | Sakai et al. ............. 320/134 |
| 2003/0048006 | A1 | * | 3/2003 | Shelter et al. ........... 307/64 |

* cited by examiner

Primary Examiner—Melissa J Koval
Assistant Examiner—Alexis Boateng
(74) Attorney, Agent, or Firm—Townsend and Townsend and Crew LLP

(57) ABSTRACT

A system includes an input configured to connect to a power source providing an input voltage, an output configured to connect to a load and to transfer power from the power source to the load, a battery selectively coupled to the input to receive current from the power source, a detector configured to indicate whether the input voltage drops more than a threshold amount, and a processor configured to regulate the selective coupling of the battery to the input to regulate a charging current supplied to the battery, the processor configured to regulate the selective coupling such that if a first charge current induces a drop in the input voltage beyond the threshold amount, then the processor will change the charging current to a second charge current that is lower than the first charge current.

31 Claims, 8 Drawing Sheets

ADAPTIVE BATTERY CHARGING

BACKGROUND

A battery charger is a type of system for use in charging a rechargeable battery so that the battery may be recharged or its charge maintained. Some battery charging systems are capable of providing power from a single power supply to both a load and to a battery. Examples of loads include modems, computers, telephones, and anything else capable of drawing electrical power. In such battery charging systems, the battery may be used to provide standby power to the load in the event of loss of power from the power supply.

Many types of power supplies are current limited, such as, for example, AC to DC power converters. For example, many AC to DC power converters include foldback current limiting protection circuitry. This protection circuitry limits the amount of current at increasing overloads.

In some situations, the power supply may be unable to provide sufficient power to both the load and to charge the battery. For example, the load may be temporarily increased so that a large amount of current is being drawn from the power supply. If the battery charger attempts to use the maximum charging current to power the increased load and the battery, it may draw too much current and cause the power supply to have a reduced output voltage. This may result in the supported load falling out of regulation.

As an example, FIGS. 1-4 illustrate exemplary curves for four different types of power sources. FIG. 1 illustrates a voltage versus current curve for a power supply with gradual current limit. As illustrated, the voltage gradually falls from 100% to about 90% of maximum as the current approaches 100% of the rating of the power supply. Beyond 100%, the voltage drops dramatically. FIG. 2 illustrates an exemplary voltage versus current curve for a power supply with a hard current limit. As illustrated, this voltage stays at approximately 100% as the current approaches 100% of the rating of the power supply, but drops off to 0 beyond this point. FIG. 3 illustrates an exemplary voltage versus current curve for an unregulated power supply while FIG. 4 shows a curve for a fold-back current limit. All of the power supplies illustrated in FIGS. 1-4 share the common feature that as the current is increased, the voltage drops as the power supply crosses 100% of the rating of the power supply.

In prior systems, a switch was used to provide power to the battery and the load. This switch had two levels, on or off. That is, if the switch was on, the battery was charged at a designed rate, and if it was off, the battery was not charged. In this system, when the power drawn by the load exceeded a threshold, the switch was turned off, thus turning off all charging power to the battery. Thus, if this high power condition persisted for a sufficient period of time, it could result in the battery becoming discharged and the system not having available standby power. This was true regardless of the amount of power drawn by the load over the threshold. Thus, the situation could arise where the switch was completely turned off even though the power drawn by the load only exceeded the threshold by a small amount.

SUMMARY

In general, in an aspect, the invention provides a method for use in a battery charging system, the method including providing power from a power source to a load, the provided power having an input voltage, providing current from the power source to a battery at a first level, monitoring a voltage associated with the input voltage to determine if the input voltage drops below a threshold voltage, and reducing the current supplied from the power source to the battery in response to detecting that the input voltage dropped more than the threshold amount such that the current supplied to the battery is provided at a desired level that is below the first level.

Implementations of the invention may include one or more of the following features. Reducing the current supplied from the power source to the battery includes: reducing the current provided from the first level to a second level; and gradually increasing the current supplied from the power source to the battery from the second level to the desired level. Gradually increasing the current supplied from the power source to the battery includes repeatedly reducing the desired level in response to determinations of drops in the input voltage below the threshold voltage during the gradual increasing of the current supplied to the battery and gradually increasing the current supplied to the battery from levels below the reduced desired levels toward a present desired level until the current supplied to the battery reaches the present desired level. Reducing the desired level includes reducing the desired level by a predetermined amount. Reducing the desired level includes reducing the desired level by an amount determined based on an amount of energy provided to the load. The method further includes: evaluating whether a time period has elapsed from a time when the desired level is reduced; and setting the desired level to a maximum desired level if the time period has elapsed. Gradually increasing the current supplied from the power source to the battery includes increasing the current by predetermined amounts. The desired level is greater than an initial level.

In general, in another aspect, the invention provides a system including an input configured to connect to a power source providing an input voltage, an output configured to connect to a load and to transfer power from the power source to the load, a battery selectively coupled to the input to receive current from the power source, a detector configured to indicate whether the input voltage drops more than a threshold amount, and a processor configured to regulate the selective coupling of the battery to the input to regulate a charging current supplied to the battery, the processor configured to regulate the selective coupling such that if a first charge current induces a drop in the input voltage beyond the threshold amount, then the processor will change the charging current to a second charge current that is lower than the first charge current.

Implementations of the invention may include one or more of the following features. The processor is further configured to gradually increase the charging current in the absence of the input voltage dropping more than the threshold amount. The processor is configured to limit the charging current to a predetermined highest charging current. The processor is configured to: gradually increase the charge current to the battery from the second charge current to a desired charge current; repeatedly reduce the desired charge current in response to drops in the input voltage below the threshold amount during the gradual increasing of the charge current; and gradually increase the charge current supplied to the battery from levels below the reduced desired charge currents toward a present desired charge current until the current supplied to the battery reaches the present desired charge current. The processor is further configured to reduce the desired charge current by a predetermined amount. The processor is further configured to reduce the desired charge current by an amount determined based on amount of power provided to the load. The processor is further configured to: evaluate whether a time period has elapsed from a time when the desired charge current is reduced; and set the desired charge current to a maximum desired charge current if the time period has elapsed. The time period is at least as long as an expected maximum duration of a maximum current draw by the load. The processor is further configured to increase the charge current by predetermined increments.

In general, in another aspect, the invention provides an uninterruptible power supply (UPS) configured to couple to a power source that provides an input voltage and to a load, the UPS comprising an input configured to couple to the power source, an output configured to couple to the load, and a battery charger coupled to the input to receive the input voltage and comprising: a battery; a monitor connected and capable of monitoring a voltage associated with the input voltage and capable of determining that the input voltage drops below a threshold voltage; and a switch configured and coupled to provide power from the power source to the load and current from the power source to the battery, the switch being adjustable to provide a range of charge current amounts to the battery, where the monitor includes means for directing the switch to reduce the current supplied from the power source to the battery in response to detecting that the input voltage drops below the threshold such that the current supplied to the battery is provided at a reduced level below a desired level and greater than an initial level.

Implementations of the invention may include one or more of the following features. The directing means is further for directing the switch to increase the current from the power source to the battery from the reduced level toward the desired level in the absence of the input voltage dropping below the threshold voltage. The directing means is further for reducing the desired level in response to the input voltage dropping below the threshold voltage and for increasing the desired level to a maximum level in response to a time period elapsing from a time of a most recent reduction in the desired level without the input voltage dropping below the threshold voltage.

In accordance with implementations of the invention, one or more of the following capabilities may be provided. Battery charging may be accomplished without unacceptably affecting power provided to a load by a power source that powers the load and provides the battery charging. Battery charging may be accomplished in the presence of a varying load power demand. Battery charging current from a source can be adjusted to maximize, or nearly maximize, the current without substantially negatively affecting power provided to other devices from the source. An appropriate battery charging current from a power supply can be determined without knowing a current limit of the power supply or an output load current. Amounts of current allowed into a battery can be controlled.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for adaptively charging a battery. For example, a battery of an uninterruptible power supply (UPS) may be charged based on an input voltage. The input voltage is monitored and if it dips more than a designated amount, indicating an inability of an input power source to provide a desired amount of power to a load and to supply the present amount of charging current, then the charging current is reduced. Other embodiments are within the scope of the invention.

Figure 1:
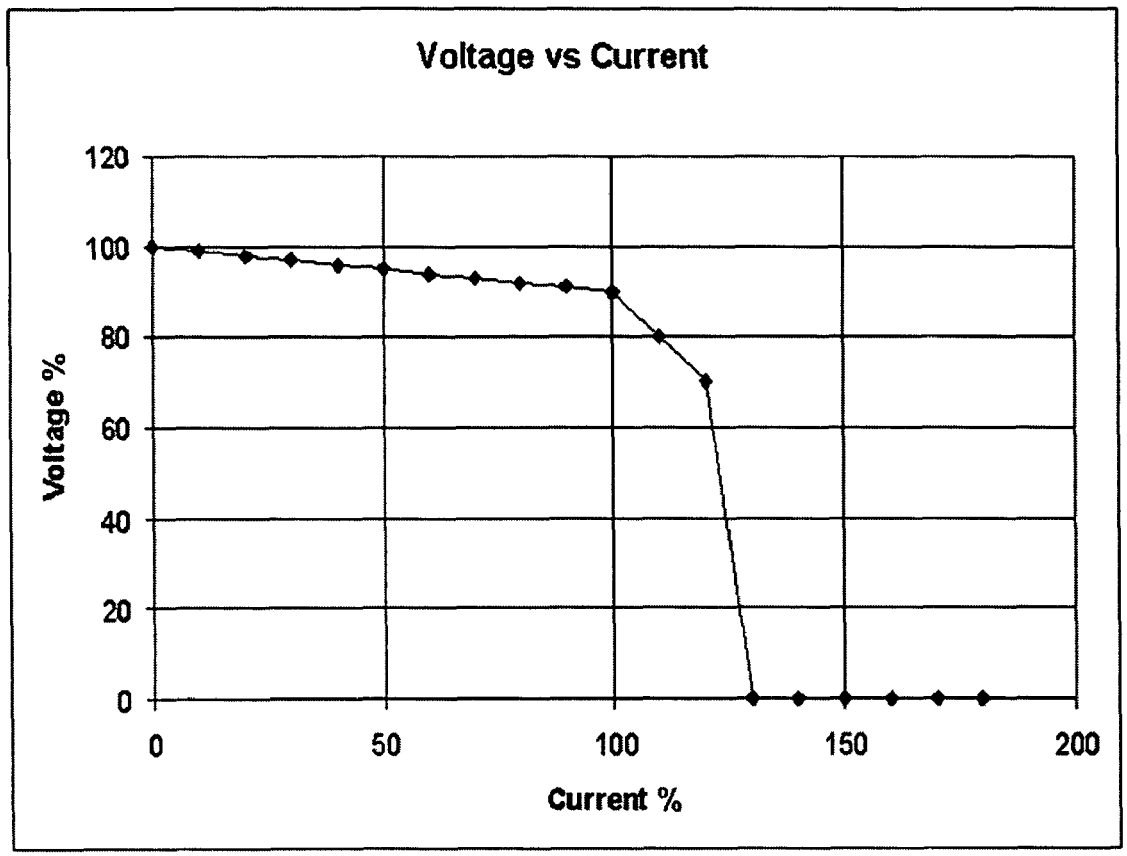
FIG. 1 illustrates a voltage versus current curve for a power supply with gradual current limit, in accordance with the prior art.
Figure 2:
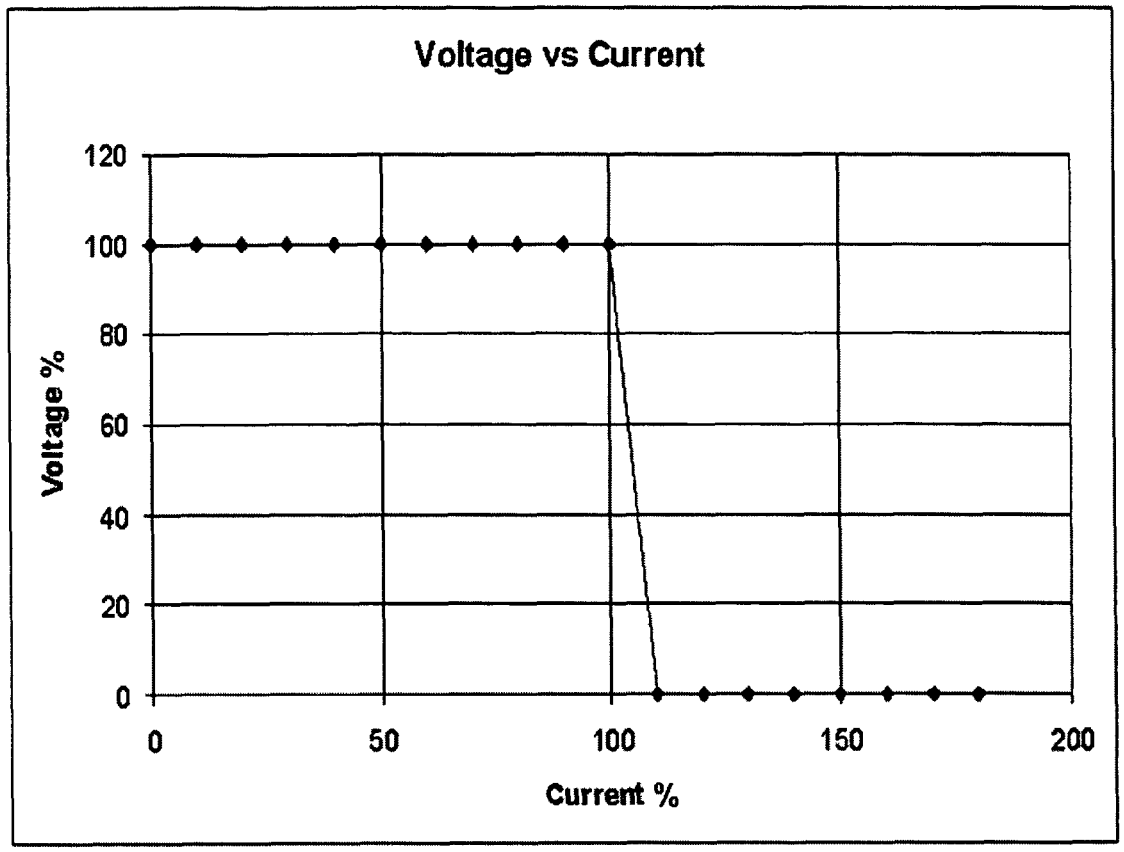
FIG. 2 illustrates an exemplary voltage versus current curve for a power supply with a hard current limit, in accordance with the prior art.
Figure 3:
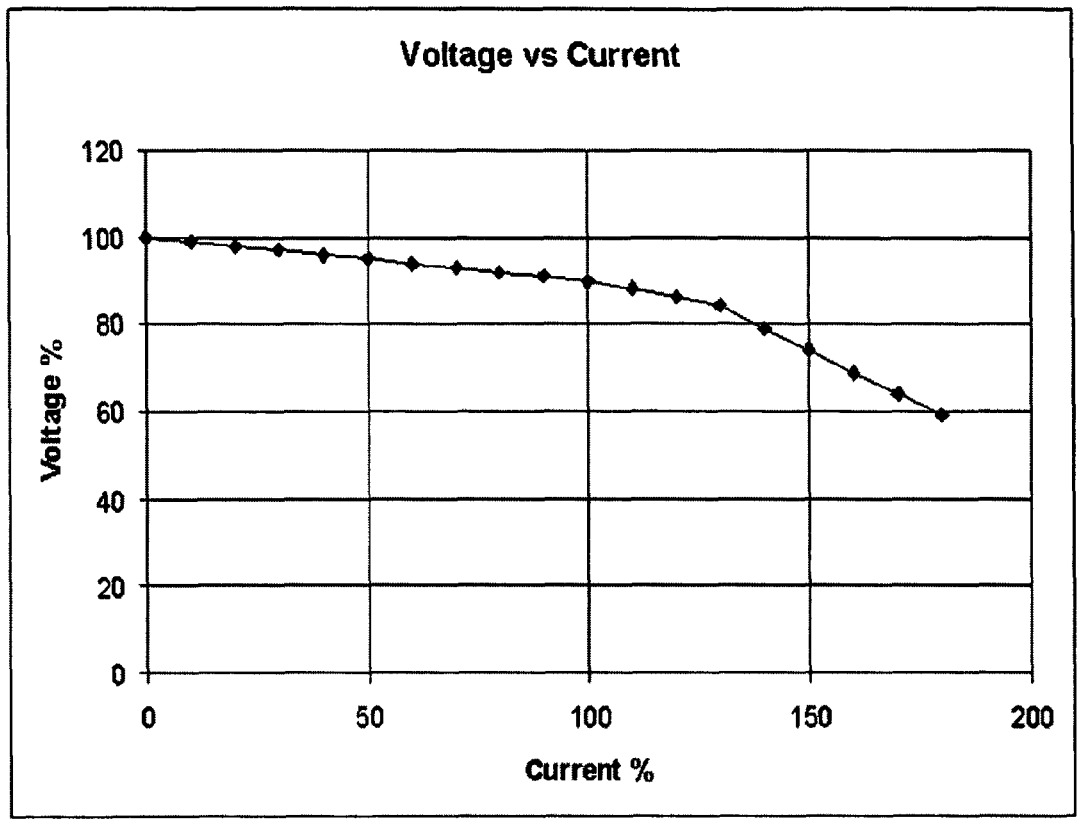
FIG. 3 illustrates an exemplary voltage versus current curve of an unregulated power supply, in accordance with the prior art.
Figure 4:
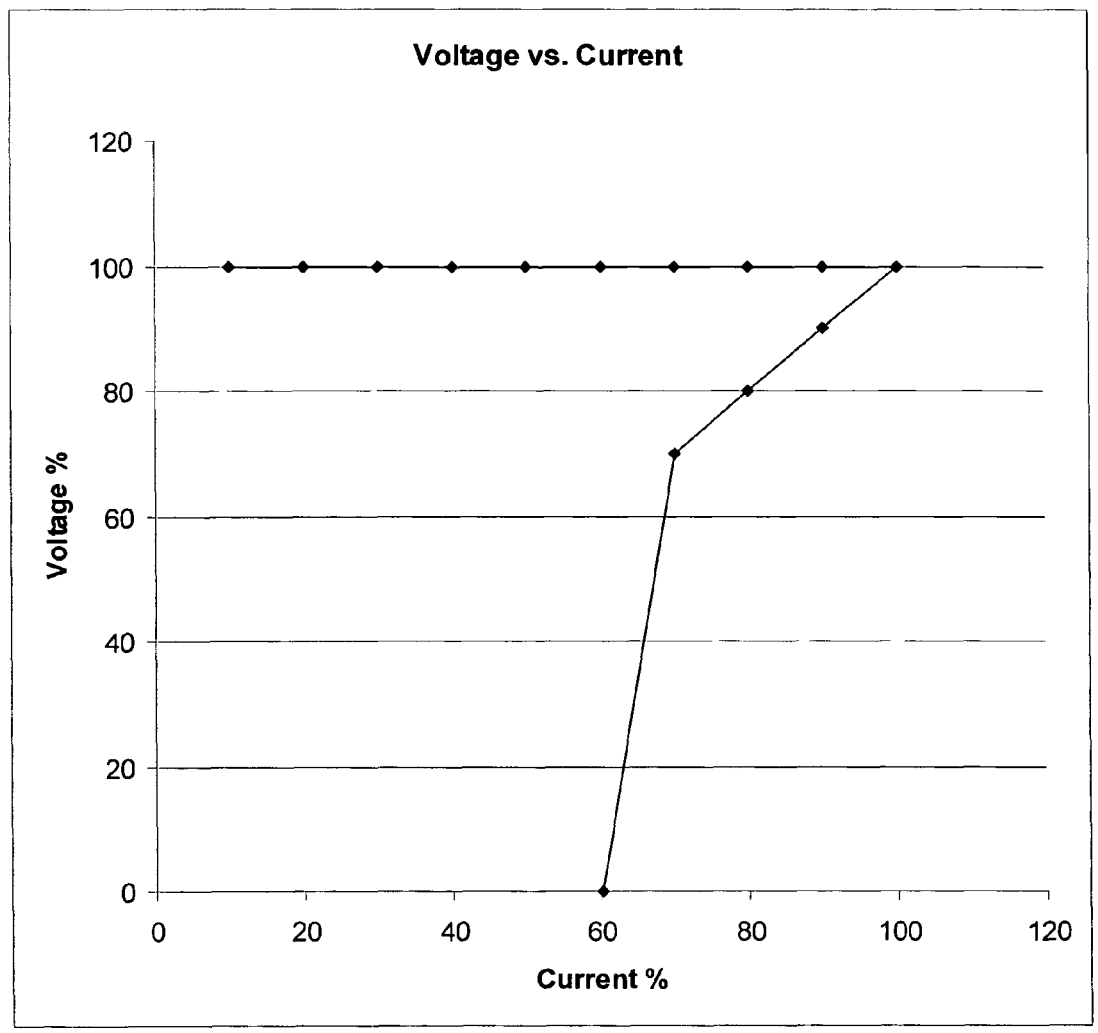
FIG. 4 illustrates an exemplary voltage versus current curve for a supply with a fold-back current limit, in accordance with the prior art.
Figure 5:
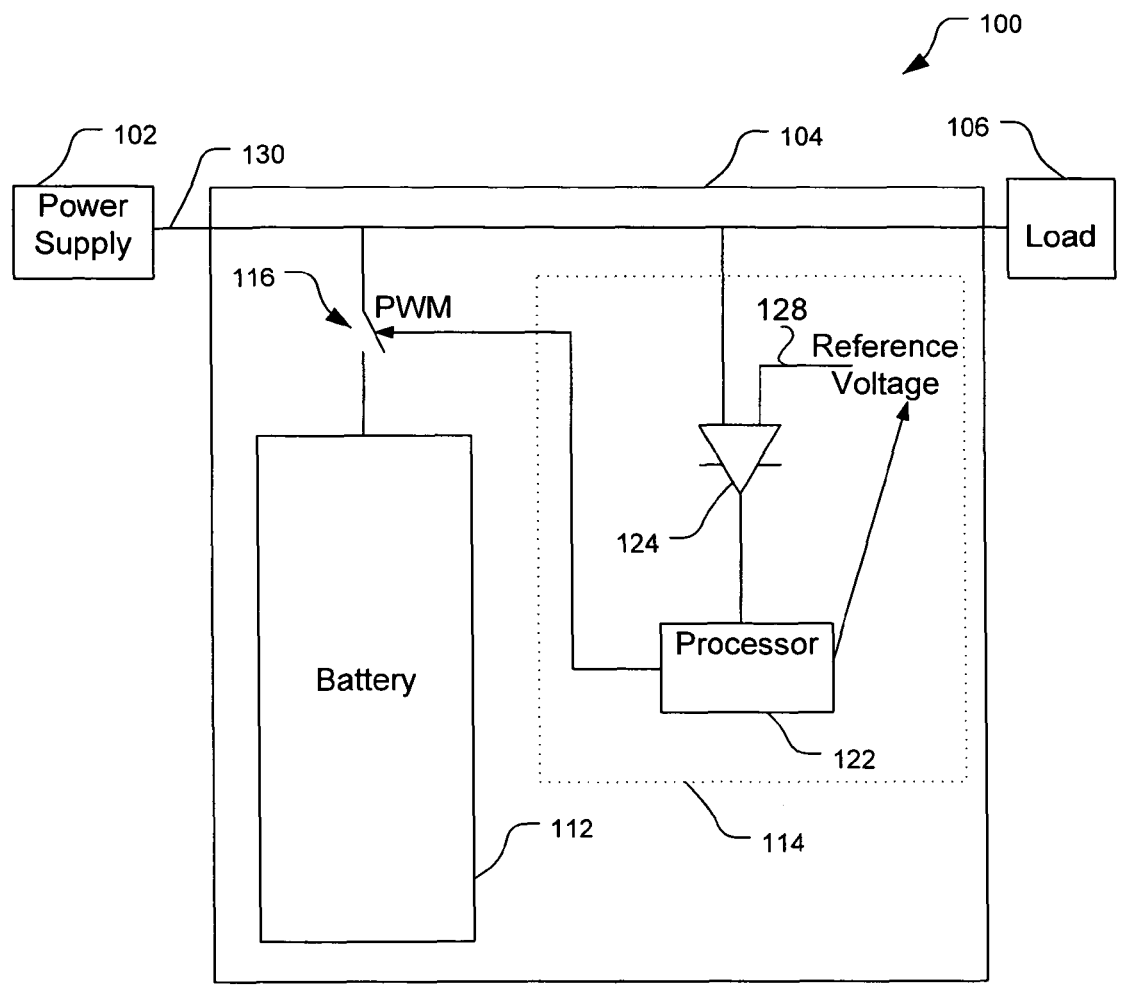
FIG. 5 is a simplified block diagram of an exemplary system for use in supplying power to a load and charging a battery.

FIG. 5 illustrates an exemplary system 100 for use in supplying power to a load and charging a battery. As illustrated, the system 100 includes a power source 102, a battery charging system 104 (e.g., that may be part of a UPS), and a load 106. The power source 102 may be any of a variety of types of power source, for example an AC to DC power supply that may be plugged into an AC wall outlet. The load 106 is capable of drawing DC power from the power source 102 or a battery 112, and may be, for example, a modem connected to a telecommunications system.

Figure 8:
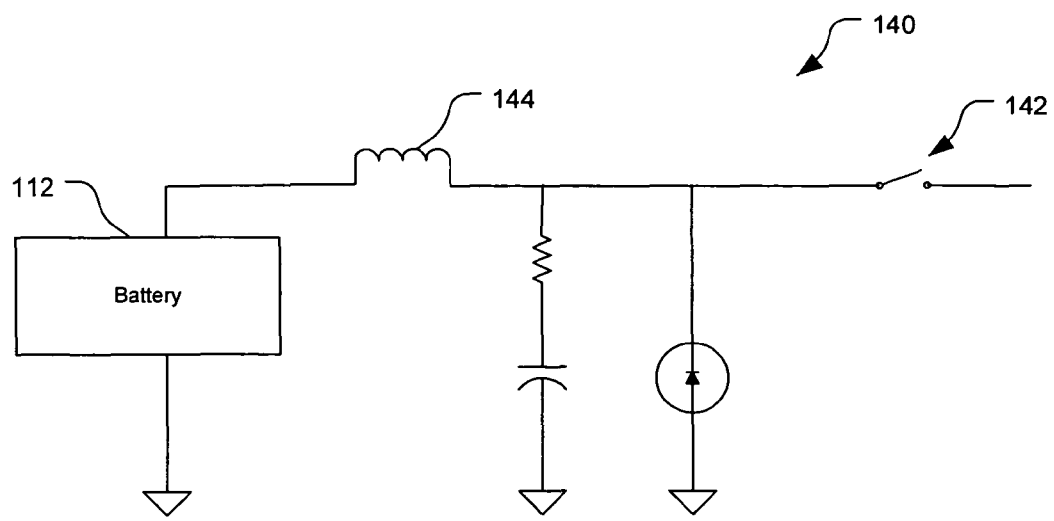
FIGS. 8-9 are simplified block diagrams showing sample implementations of a battery charger portion of the system shown in FIG. 5.
Figure 9:
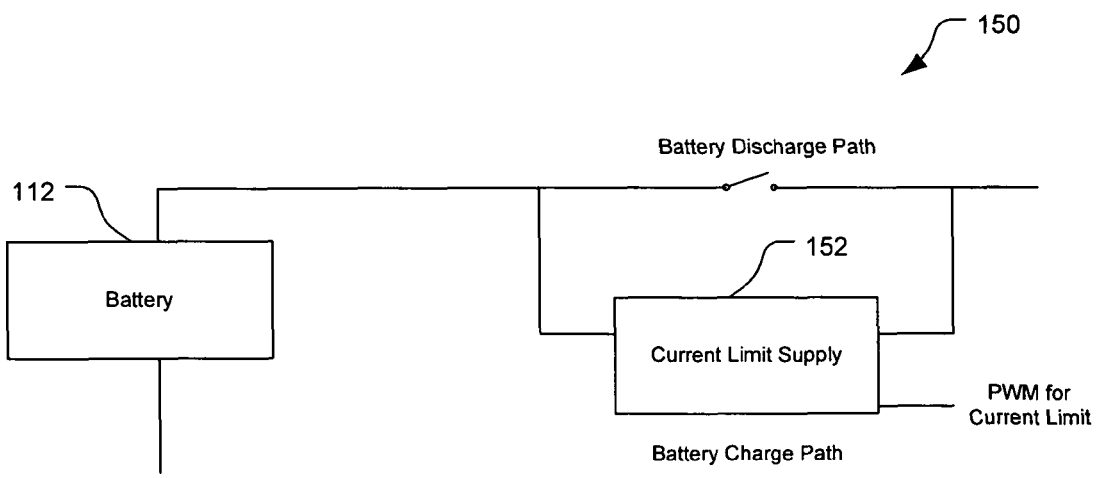

The battery charging system 104, as illustrated, includes a battery 112, a power monitoring subsystem 114, and current controlled charger with a switch 116. The battery 112 is a rechargeable battery, of which many types exist and may be used. The switch 116 is capable of adjusting the current supplied to the battery 112 and allows the battery to supply power to the load in the event of a failure of the power supply 102. For example, the switch 116 is a Pulse Width Modulated (PWM) switch capable of adjusting the amount of current provided to the battery 112 in accordance with an opening and closing duty cycle of the switch 116. The switch 116 may be adjustable across a range of 0 to 100 percent, where when set at 0, all power is provided to the load 106 and none to the battery 112, and when set to 100%, a predetermined maximum allowable current is delivered to the battery 112. When the switch 116 is set at 60%, the battery is delivered 60% of its design maximum current leaving the remaining current available for the load 106. This setting may be referred to as the switch level. The switch 116 as shown in FIG. 5 is a simplification of various possible implementations. FIGS. 8-9 show exemplary embodiments of a battery charger including the battery 112 and exemplary embodiments of the switch 116, here systems 140 and 150. In the system 140, a single switch 142 with an inductor 144 is used to limit the current to the battery 112 when a PWM signal is applied to the switch 142. When the switch 142 is held on, the battery 112 is allowed to power the load through the inductor 144 with minimal loss. In the system 150, a separate current limiting supply 152 is included to limit the current to the battery 112 as directed by a PWM signal.

As illustrated, the power monitoring subsystem 114 includes circuitry for monitoring the voltage of the power provided to the load 106 and adjusting the level of the switch 116 so that more or less power is supplied to the battery 112. The power monitoring subsystem 114 includes a comparator 124 and a processor 122. The comparator 124 is connected to a reference voltage 128 and to the power supply 102, that is here the same as the input to the system 104 and the input to the load 106. The comparator 124 is configured to compare the input voltage ($V_{in}$) 130 from the power supply 102 with the reference voltage 128 and indicate to the processor 122 whether the input voltage 130 is below the reference voltage 128 (i.e., drops more than a threshold amount below the expected maximum input voltage). The value of the reference voltage 128 is predetermined based upon knowledge of the input voltage 130 of the supply 102 and an acceptable amount of voltage drop in the supply voltage corresponding to an acceptable decrease in power to the load 106. The reference voltage 128 may be provided by the processor 122 or other circuitry (not shown). Additionally, in other examples this reference voltage may be adjusted dynamically by the processor 122, e.g., based on changes in power demand by the load 106 or on measurements of the power supply under no load conditions.

The processor 122 is coupled to the comparator 124 to receive the output of the comparator 124. The processor 122 may include a central processing unit (CPU) and memory that stores software instructions for execution by the CPU, or other configurations such as all hardware, or firmware, or combinations of these, such that the processor 122 is configured to perform the functions described. The processor 122 is configured to control the switch 116 by regulating a PWM signal provided to the switch 116 to adjust the level of the switch corresponding to the PWM signal level/value. The PWM signal controls the switch 116 to close and open according to a duty cycle of the PWM signal. The PWM signal has a maximum duty cycle corresponding to the maximum amount of charging current to be provided to the battery 112.

The processor 122 is configured to control the PWM signal between a PWM-MIN level and a PWM-MAX level. These levels may change, although the processor 122 is preferably programmed with a non-changing highest allowable value for the PWM-MAX level. The PWM-MIN level may be, for example, 0%, although other levels higher than 0 are acceptable, e.g., in cases where a parasitic load is attached to the battery 112 and it is desired not to discharge the battery 112. The PWM-MIN value may be static or dynamically derived, e.g., depending on the state of the system such as the current drawn by a parasitic load on the battery 112 to ensure some charging current for a dead battery, and/or to ensure that a dead battery is not provided with too much charging current. The PWM-MAX level may be static or dynamically derived, e.g., based upon the current drawn by the load 106 (with higher load currents corresponding to lower PWM-MAX values), or the condition of the battery 112 (e.g., to avoid providing a large charging current to a dead battery), or the maximum charge current allowed by the battery, and/or other factors.

The processor 122 is configured to implement a ramp timer. The ramp timer is run when the processor 122 initially issues the PWM signal or increases the PWM signal level. The ramp timer runs for a designated an amount of time for which a new PWM signal level is used before potentially increasing the PWM signal level. The ramp timer preferably runs for a time that is long enough to allow the processor 122 sufficient time to accurately determine the PWM signal level when the input voltage dips, and to allow the charge current corresponding to the PWM signal to reach a steady state. An example of the time provided by the ramp timer is 1 ms.

The processor 122 is also configured to implement a PWM-MAX timer. The PWM-MAX timer is reset every time that the PWM signal level is decreased due to an unacceptable drop in the input voltage, corresponding to a decrease in the PWM-MAX level. When the PWM-MAX timer expires, the processor 122 resets PWM-MAX level to the predetermined or dynamically calculated PWM-MAX value. This timer guards against using a low charge current when the load has reduced its current consumption. The PWM-MAX timer is preferably set for a time period that corresponds to the peak load current duration. An example of this value may be 30 seconds for a telecommunication system that supports a telephone ringing operation.

Although the above elements of the power supply 102, the load 106, and the battery charging system 104 are illustrated as separate entities, two or more these elements in other embodiments may be combined, e.g., in a single entity.

Figure 6:
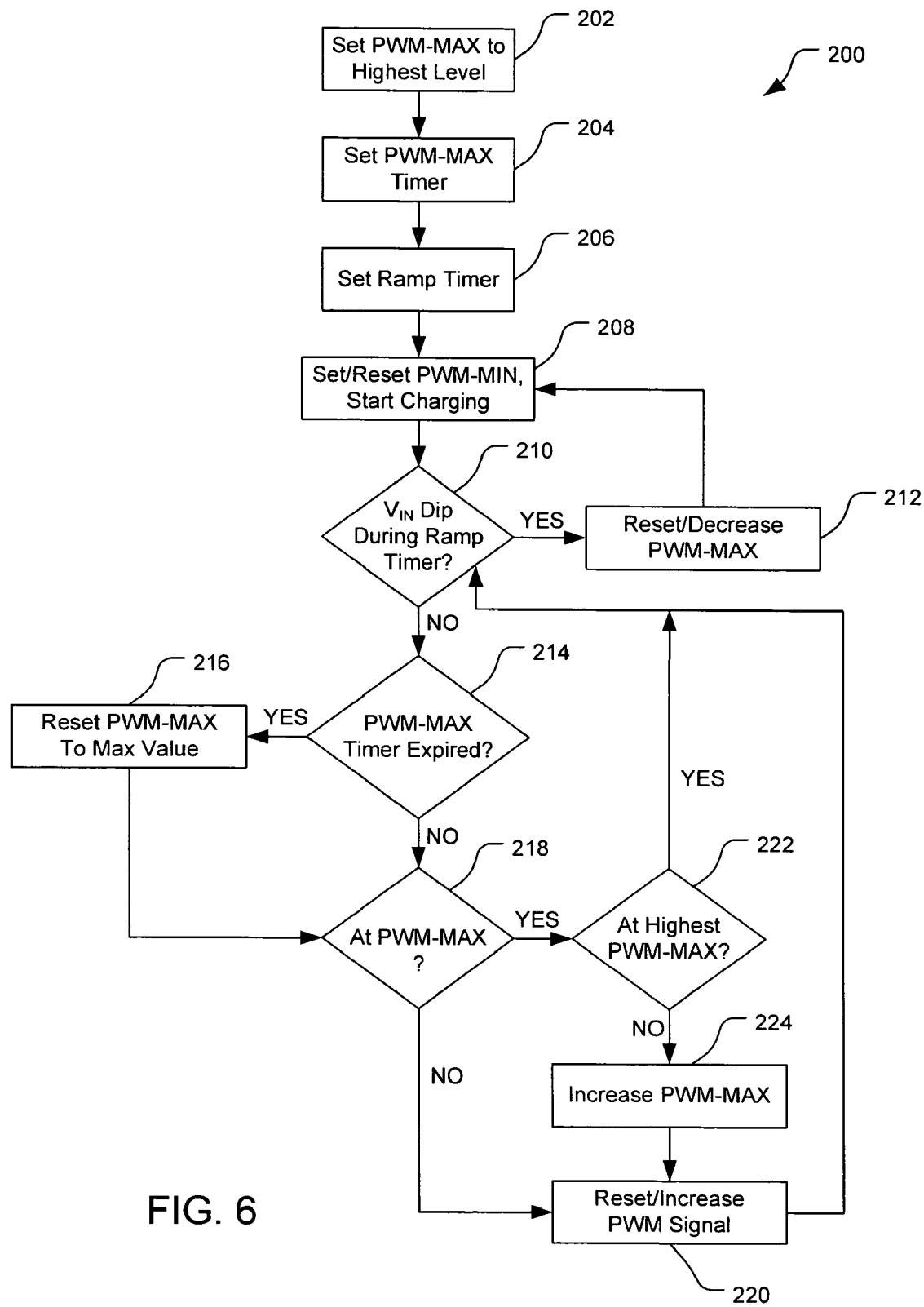
FIG. 6 is a block flow diagram of a process for adaptively supplying power to the battery in the system shown in FIG. 5.

In operation, referring to FIG. 6, with further reference to FIG. 5, a process 200 for adapting battery charging current using the system 100 includes the stages shown. The process 200, however, is exemplary only and not limiting. The process 200 may be altered, e.g., by having stages added, removed, or rearranged. The process 200 attempts to maximize, or nearly maximize, the amount of current supplied by the source 102 to the battery 112 without unacceptably depriving the load 106 of power. The process 200 helps ensure that the load 106 receives sufficient power to operate acceptably. The process 200 regulates the PWM signal between a minimum level, PWM-MIN, and a maximum level, PWM-MAX. The present PWM signal level is ramped from the PWM-MIN value toward the PWM-MAX value. If during the ramping up, or after achieving the PWM-MAX level, a drop in the input voltage more than a threshold amount is detected, then the PWM-MAX level is adjusted to below the present PWM signal level and the PWM signal level is set to a lower value and ramped up toward the new PWM-MAX level. If the PWM-MAX level is reached, then the system remains charging at this level until the PWM-MAX timer expires. When the PWM-MAX timer expires, the PWM-MAX level can be increased, as high as a highest allowable level, and the PWM signal increased toward this new, increased PWM-MAX level.

At stage 202, the PWM-MAX level is set. The PWM-MAX level is preferably set to a default value, e.g., 60% of the highest allowable PWM-MAX level.

At stage 204, the PWM-MAX timer is set. This timer may be programmed based on the load 106, and in particular the longest anticipated peak load current duration.

At stage 206, the ramp timer is set. The ramp timer value may be set to a default value such as 1 ms, or may set based on parameters of the system 100, e.g., the speed of the processor 122 for evaluating input voltage dips, etc.

At stage 208, the PWM-MIN level is set and the PWM signal is issued at the PWM-MIN level. Initially, the PWM-MIN level may be set to a default value, such as 0%, or to a static or dynamically derived value higher than 0% (e.g., to accommodate parasitic loads on the battery 112). For subsequent visits to stage 208, the PWM-MIN level may be reset to a static value, or to a dynamically derived value, e.g., based on system parameters, and/or based on the PWM signal level that induced an input voltage dip as discussed below, and/or other factors.

At stage 210, an inquiry is made as to whether the input voltage 130 drops unacceptably low during running of the ramp timer. The ramp timer is started and the processor 122 monitors the output of the comparator 124. If this output indicates that the input voltage 130 has dropped below the reference voltage 128, then the process proceeds to stage 212, and otherwise proceeds to stage 214 upon expiration of the ramp timer.

At stage 212, the PWM-MAX timer is started and the PWM-MAX level is reset to a lower level than the present value of PWM-MAX. The PWM-MAX level is reset to a level below the present PWM signal level. For example, the new PWM-MAX level may be a fixed amount lower than the present PWM level, such as 5% so that if the present PWM signal level that induced the voltage drop is 50%, the new PWM-MAX level is 45%. Other values fixed reductions could be used. Non-fixed amounts could be used, such as a percentage, e.g., 50%, of the present PWM level. Other non-fixed amounts could be used, as well as combinations of fixed and non-fixed amounts (e.g., 75% of the present PWM signal minus 5%). With the new PWM-MAX level, the process 200 returns to stage 208 for resetting, as appropriate and/or desired, of the PWM-MIN level. The PWM-MIN level may be reset to the default value, or may be based upon factors such as the present PWM signal level that induced the input voltage drop. For example, with a PWM signal level of 50% inducing the drop, the PWM-MIN level may be reset to a level below the new PWM-MAX level, but above the initial PWM-MIN level, such as 20% below the new PWM-MAX level (with appropriate floors being used, e.g., 0% or higher, e.g., due to parasitics, etc.). The change may be static (e.g., fixed percentage increase, fixed percentage of the present value) or dynamically determined.

At stage 214, with no input voltage drop below the threshold voltage 128 detected during the ramp timer's run, an inquiry is made as to whether the PWM-MAX timer has expired. The processor 122 determines whether the PWM-MAX timer had been activated and has run its course. If not, then the process 200 proceeds to stage 218 and otherwise proceeds to stage 216.

At stage 216, with the PWM-MAX timer having been activated and now expired, the processor 122 resets the PWM-MAX level. The PWM-MAX level is reset to the pre-determined or dynamically derived level as any load-current demand increase that induced a reduction in available charge current should have passed. The process 200 proceeds to stage 218.

At stage 218, an inquiry is made as to whether the present PWM signal level is at the PWM-MAX level. If not, then the process 200 proceeds to stage 220 and otherwise proceeds to stage 222.

At stage 220, the PWM signal level is reset/increased. At this point, it has been determined that the present PWM signal level has not induced an unacceptable voltage drop and that the PWM-MAX level has not been reached. The PWM signal is thus reset to a higher level to provide for more charge current for the battery 112. The new PWM signal level may be a fixed amount higher than the present PWM signal level, e.g., 1% (e.g., present signal level is 50% and new level is 51%), 2%, 5%, 10%, or other amount. Further, the amount may be higher on subsequent visits to stage 216, e.g., with an initial increase being 1%, the next increase being 2%, the next 5%, etc. The new PWM signal level may also be a non-fixed amount higher than the present level such as a percentage of the present PWM signal, e.g., 105%, or higher by a combination of fixed and non-fixed amounts. The change may be static (e.g., fixed percentage increase, fixed percentage of the present value) or dynamically determined.

At stage 222, with no voltage dip induced during the PWM-MAX timer's run and with the PWM signal at the PWM-MAX level, an inquiry is made as to whether the PWM signal level is at the highest allowable PWM-MAX level. If so, then the process 200 returns to stage 210 for further monitoring for an input voltage drop, and otherwise proceeds to stage 224.

At stage 224, the PWM-MAX level is increased. The level may be increased by a fixed amount, e.g., 5%, a non-fixed amount, or a combination of fixed and non-fixed amounts that may be static or dynamically determined. The increase is capped by the predetermined highest allowable PWM-MAX level. Indeed, the PWM-MAX level may be set directly to the highest allowable level. Using the process 200, if the PWM-MAX level has been set or reset to a value below the highest allowable level, the PWM-MAX level may eventually be set to (or return to) the highest allowable level if unacceptable input voltage drops do not result from increasing the charge current (i.e., the power supply can provide the highest allowable charge current and still acceptably power the load 106). With the PWM-MAX level reset, the process 200 proceeds to stage 216 for increasing of the PWM signal level and further evaluation of the input voltage 130 relative to the reference voltage 128.

Figure 7:
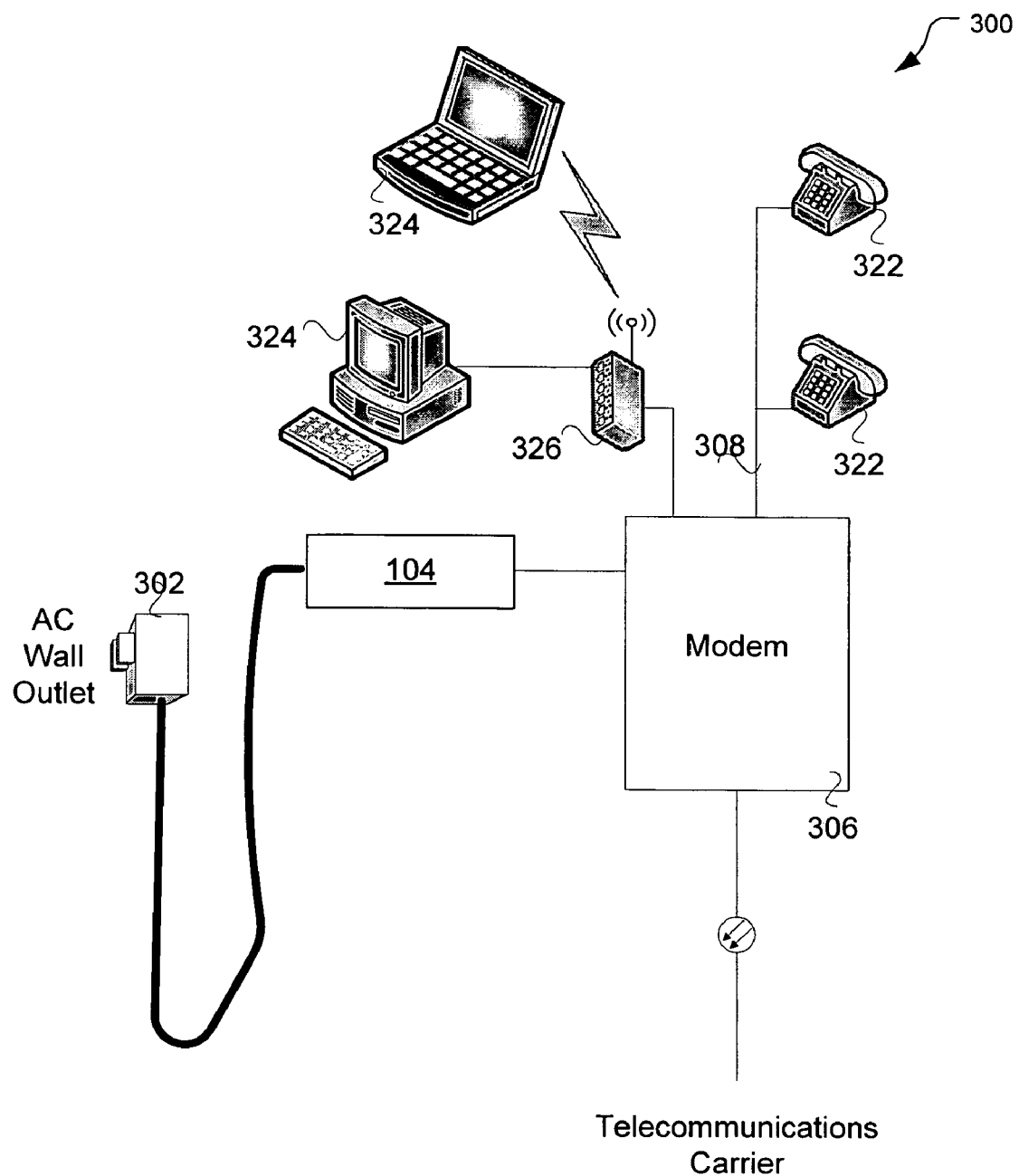
FIG. 7 is a simplified block diagram of a household telecommunications application of the system shown in FIG. 5.

FIG. 7 illustrates an exemplary embodiment of a system 300 for a telecommunications modem deployed in a household. The system 300 includes a power source 302 that may be, for example, an AC to DC power converter. The system 300 includes a modem 306 connected to a fiber optic cable or coaxial cable for providing telecommunications services, such as those available from a person's local telephone or cable carrier. The modem 306 is deployed in the house of a user and connected to telephone wiring 308 of the house. The telephone wiring 308 is connected to one or more telephones 322 in the house. End users may use the telephones 322 to place and receive telephone calls in the same manner as used with the plain old telephone system (POTS). Additionally, the modem 306 is here connected to one or more computers 324 via a router 326, enabling the end user to utilize services, such as high speed Internet access services provided by a telecommunications carrier.

Additionally, the system 300 includes a UPS 304 that includes a battery charging system 304 similar to the system 104 shown in FIG. 5. The UPS 304 is deployed so that in the event of a power failure, the modem 306 may resort to battery backup. Thus, in the event of a power failure, end users may still be able to communicate using their standard home telephones 322.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to "the invention," the description may include more than one invention.

What is claimed is:

1. A method for use in a battery charging system, the method comprising:

providing power from a power source to a load, the provided power having an input voltage;

providing current from the power source to a battery at a first level;

9 monitoring a voltage associated with the input voltage to determine if the input voltage drops below a threshold voltage; and reducing the current supplied from the power source to the battery in response to detecting that the input voltage dropped below the threshold voltage such that the current supplied to the battery is provided at a second level that is below the first level.

2. The method of claim 1 further comprising:

gradually increasing the current supplied from the power source to the battery from the second level toward a desired level.

3. The method of claim 2 wherein gradually increasing the current supplied from the power source to the battery includes repeatedly reducing the desired level in response to determinations of drops in the input voltage below the threshold voltage and gradually increasing the current supplied to the battery from levels below the reduced desired levels toward a present desired level until the current supplied to the battery reaches the present desired level.

4. The method of claim 3 wherein reducing the desired level includes reducing the desired level by a predetermined amount.

5. The method of claim 3 wherein reducing the desired level includes reducing the desired level by an amount determined based on an amount of energy provided to the load.

6. The method of claim 3 further comprising:

evaluating whether a time period has elapsed from a time when the desired level is reduced; and setting the desired level to a maximum desired level if the time period has elapsed.

7. The method of claim 2 wherein gradually increasing the current supplied from the power source to the battery includes increasing the current by predetermined amounts.

8. The method of claim 1 wherein the desired level is greater than an initial level.

9. A system comprising:

an input configured to connect to a power source providing an input voltage;

an output configured to connect to a load and to transfer power from the power source to the load;

a battery;

a connection mechanism, coupled to the input and the battery, configured to selectively couple the input to the battery to selectively provide current from the power source to the battery; and a processor, coupled to the connection mechanism, configured to regulate the selective coupling of the battery to the input to regulate a charging current supplied to the battery such that when the charging current is at a first level and the input voltage drops below a threshold voltage level, the processor will change the charging current to a second level that is lower than the first level.

10. The system of claim 9 wherein the processor is further configured to gradually increase the charging current toward a desired level in the absence of the input voltage dropping below the threshold voltage.

11. The system of claim 9 wherein the processor is configured to limit the charging current to a predetermined highest level.

12. The system of claim 9 wherein the processor is configured to:

gradually increase the charge current to the battery from the second level to a desired level;

repeatedly reduce the desired level in response to drops in the input voltage below the threshold voltage during the gradual increasing of the charge current; and

10 gradually increase the charge current supplied to the battery from levels below the reduced desired level toward a present desired level until the current supplied to the battery reaches the present desired level.

13. The system of claim 12 wherein the processor is further configured to reduce the desired level by a predetermined amount.

14. The system of claim 12 wherein the processor is further configured to reduce the desired level by an amount determined based on amount of power provided to the load.

15. The system of claim 12 wherein the processor is further configured to:

evaluate whether a time period has elapsed from a time when the desired level is reduced; and set the desired level to a maximum desired level if the time period has elapsed.

16. The system of claim 15 wherein the time period is at least as long as an expected maximum duration of a maximum current draw by the load.

17. The system of claim 9 wherein the processor is further configured to increase the charge current by predetermined increments.

18. An uninterruptible power supply (UPS) configured to couple to a power source that provides an input voltage, and to a load, the UPS comprising:

an input configured to couple to the power source;

an output configured to couple to the load; and a battery charger coupled to the input to receive the input voltage and comprising:

a battery;

a monitor connected and capable of monitoring a voltage associated with the input voltage and capable of determining that the input voltage drops below a threshold voltage;

coupling means for selectively providing power from the power source to the load and a range of charge current amounts from the power source to the battery; and means for directing the coupling means to reduce the current supplied from the power source to the battery in response to the monitor detecting that the input voltage drops below the threshold voltage such that the current supplied to the battery is provided at a reduced level below a first level and greater than an initial level.

19. The system of claim 18 wherein the directing means is further for directing the coupling means to increase the current from the power source to the battery from the reduced level toward a desired level in the absence of the input voltage dropping below the threshold voltage.

20. The system of claim 19 wherein the directing means is further for reducing the desired level in response to the input voltage dropping below the threshold voltage and for increasing the desired level to a maximum level in response to a time period elapsing from a time of a most recent reduction in the desired level without the input voltage dropping below the threshold voltage.

21. The method of claim 3 further comprising:

increasing the desired level in response to the current supplied to the battery reaching the present desired level.

22. The method of claim 21 wherein the desired level is increased until the desired level reaches a predetermined maximum level.

23. An adaptive battery charging system comprising:

a system input configured to couple to an external power source providing an input voltage;

a system output configured to couple the input voltage to a load;

a battery;

a connection mechanism, coupled to the system input and the battery, configured to provide charging current to the battery from the system input; and means, coupled to the connection mechanism, for controlling the connection mechanism to increase an amount of the charging current provided to the battery as a function of input voltage while ensuring that a sufficient power is provided from the power supply to the load.

24. The system of claim 23 wherein the connection mechanism is a Pulse Width Modulated (PWM) switch.

25. The system of claim 23 wherein the control means is configured to ramp up the amount of charging current from a lower level to an upper level.

26. The system of claim 25 wherein the control means is configured to respond to the input voltage dropping below an acceptable threshold voltage by setting the upper level to a level below a present level.

27. The system of claim 26 wherein the control means, is configured to at least one of the following:

(1) set the lower level to a predetermined level;

(2) set the lower level as a function of a charging current level that induces the input voltage to drop below the threshold voltage;

(3) set the upper level as a function of a charging current level that induces the input voltage to drop below the threshold voltage.

28. The system of claim 27 wherein the control means is configured to gradually increase the current supplied from the power source to the battery from the lower level to a desired upper level in the absence of the input voltage dropping below the threshold voltage, repeatedly reduce the desired upper level in response to determinations of drops in the input voltage below the threshold voltage, and gradually increase the charging current from the lower level toward a present desired upper level until the charging current reaches the present desired upper level.

29. The system of claim 28 wherein the control means is configured to respond to the charging current reaching the present desired upper level by increasing the present desired upper level until the desired upper level reaches a predetermined maximum level.

30. The system of claim 29 wherein the control means is configured to respond to a time period elapsing from a time when the upper level is decreased by increasing the upper level.

31. The system of claim 30 wherein the control means is configured to increase the upper level to either a dynamically determined level or to a predetermined maximum level.

* * * * *